UNITED STATES PATENT OFFICE.

EDWARD MARK SLOCUM, OF MEDAN, SUMATRA, DUTCH EAST INDIES, ASSIGNOR TO GENERAL RUBBER COMPANY, A CORPORATION OF NEW JERSEY.

RUBBER COAGULUM OR SIMILAR MATERIAL AND PROCESS FOR THE PREPARATION OF SAME FOR VULCANIZATION.

1,259,794.             Specification of Letters Patent.     Patented Mar. 19, 1918.

No Drawing.       Application filed January 8, 1917. Serial No. 141,289.

*To all whom it may concern:*

Be it known that I, EDWARD MARK SLOCUM, a citizen of the United States, residing at Medan, Province of Deli, Sumatra, Dutch East Indies, have invented certain new and useful Improvements in Rubber Coagula or Similar Materials and Processes for the Preparation of Same for Vulcanization, of which the following is a full, clear, and exact description.

This invention relates to rubber coagulum or similar material such as gutta percha, chicle, or artificial rubber containing nitrogenous compounds such as protein and to processes for the preparation of such of these substances as may be desired for vulcanization, and is more particularly directed to a process for conserving within the coagulum or similar material, prior to vulcanization, these nitrogenous and other constituents in approximately the same amount as present in the freshly coagulated latex or coagulam.

These nitrogenous substances and other materials such as sugars, gums, etc., held in solution, suspension, or other form in the coagulum, have heretofore exuded forming a slime upon the surface of the coagulum. Washing of the coagulum for removal of the slime as heretofore practised is objectionable due to the loss from the rubber of the nitrogenous and other materials which represent valuable constituents thereof, since, when disseminated throughout the mass, they aid in vulcanization, acting as catalysts, and cause a general improvement in the physical properties of the cured rubber.

The exudation of these materials in the form of slime is also objectionable because they offer a field for growth of molds, yeast, fungi, bacteria, vermin and the larvæ of insects, and interfere with the drying of the coagulum by forming a coating over its surface. Washing away of the slime to overcome these objections is also inadequate adding very little if any speed to drying and resulting in only temporary removal of the field for bacterial and other growth, since if the coagulum is allowed to stand after washing exudation again occurs.

It has hence been my principal object to devise a simple, efficient process for the preparation of a rubber mass for vulcanization free from the tendency to slime formation and including the nitrogenous and other materials therein thoroughly disseminated throughout the mass, and with this in view I have sought also to remove permanently the field for plant and animal growth and to accelerate the drying of the coagulum.

In carrying out the process a mass of rubber coagulum, gutta percha, chicle, artificial rubber or other substance, is subjected to one or more reactive substances, adapted to form in the mass a portion capable of preventing the passage of colloidal nitrogenous or similar matter therethrough so that the protein or protein-resembling material may not exude to form a slime. The treatment is continued with such concentration and for such period that a semi-permeable membrane is formed in the mass adapted to permit the passage of moisture therethrough and thus to allow the rapid drying of the mass, but also adapted to prevent the passage of colloidal nitrogenous or similar material therethrough, thus preserving the valuable protein substances, etc., within the interior of the coagulum.

In its specific form the process consists in immersing a freshly-pressed block of rubber coagulated from *Hevea* latex, for example, in an alcoholic solution of beta-naphthol containing 5 parts of beta-naphthol per 100 parts of solvent. The block is allowed to remain in the solution for a short period, thirty to forty seconds, until a semi-permeable layer is formed on the surface. The block is then withdrawn and allowed to dry in the usual manner, the membrane serving to allow moisture to pass out freely but retaining the nitrogenous and other substances on the inside. This membrane which penetrates somewhat into the interior of the mass appears to be a compound of the protein and similar material with beta-naphthol. Either prior or subsequent to the treatment of the coagulum sulfur or other vulcanizing agent is incorporated with the mass which may then be vulcanized.

The preferred reactive agent which I have employed for carrying out the process is beta-naphthol mentioned above, and such similar compounds. It will be understood, however, that I do not intend to limit myself to these substances and that they are only examples of a large class of materials with which experiments have been conducted and which are capable of forming an insoluble enveloping layer to resist the passage of colloidal nitrogenous and similar substances. This class includes the following:

Mono or poly-hydroxy benzenoids having either mono-cyclic or poly-cyclic structure or the ethers, esters, salts, polymers, or other compounds of these substances.

Examples of such possible reagents are:

Gallic acid, tannins, cresols, naphthols, diamido phenol, paramido phenol, etc. Under this group, of course, comes beta-naphthol, mentioned above.

It will be further observed that in carrying out the treatment of the coagulum the reactive material may be dusted upon the surface of the mass or may be spread on as a paste. If in liquid form it may be dashed, poured, sprayed, or painted upon the material; or again the rubber block or other mass may be wrapped or otherwise surrounded with a material capable of applying the slime-preventing substance thereto. In other words, the bringing together of the material to be treated and the reactive substance may take place in any well recognized way for the application of solids, liquids, or gaseous substances to such materials.

It has been found that the coagulum produced by the treatment set forth possesses excellent characteristics in that it is free from slime, the nitrogenous constituents are thoroughly disseminated therethroughout, and when vulcanized a general improvement of the physical characteristics of the cured material is observed. It is furthermore noted that the drying to which the coagulum is subjected is accelerated by the process, and that by virtue of the absence of slime there is no field to attract bacteria, vermin, etc.

Having thus described my invention, what I claim and desire to protect by Letters Patent is:

1. The process of treating a mass of rubber coagulum or similar substance containing nitrogenous material, which comprises subjecting the mass to an agent adapted to form therein a layer comprising part of the mass but characteristically different from other portions of the mass capable of preventing the passage of colloidal nitrogenous mater therefrom, forming said layer and combining a vulcanizing agent with the mass.

2. The process of treating a mass of rubber coagulum or similar substance containing nitrogenous material, which comprises subjecting the mass to an agent adapted to form a semi-permeable layer comprising part of the mass but characteristically different from other portions of the mass capable of preventing the passage of colloidal nitrogenous or similar material therethrough, forming said layer and combining a vulcanizing agent with the mass.

3. The process of treating a mass of rubber coagulum or similar substance containing nitrogenous material, which comprises subjecting the mass to an organic substance adapted to act upon the nitrogenous material, to form in the mass an insoluble layer comprising nitrogenous material forming part of the mass but characteristically different from other portions of the mass adapted to prevent the passage of colloidal nitrogenous or similar material therethrough, forming said layer and combining a vulcanizing agent with the mass.

4. The process of treating a mass of rubber coagulum or similar substance containing nitrogenous material, which comprises subjecting the mass to a hydroxy derivative of the benzene series, forming in the mass a layer characteristically different from other portions of the mass comprising said nitrogenous material and said hydroxy derivatives adapted to prevent passage of colloidal nitrogenous or similar material therethrough, and combining a vulcanizing agent with the mass.

5. The process of treating a mass of rubber coagulum or similar substance containing nitrogenous material, which comprises subjecting the mass to a hydroxy derivative of a polycyclic member of the benzene series, forming in the mass a layer adapted to prevent passage of colloidal nitrogenous or similar material therethrough, and combining a vulcanizing agent with the mass.

6. The process of treating a mass of rubber coagulum or similar substance containing nitrogenous material, which comprises subjecting the mass to a hydroxy naphthalene, forming in the mass a layer adapted to prevent passage of colloidal nitrogenous or similar material therethrough, and combining a vulcanizing agent with the mass.

7. The process of treating a mass of rubber coagulum or similar substance containing nitrogenous material, which comprises applying beta-naphthol or its derivatives to the mass, forming a semi-permeable membrane on the surface of said mass consisting of a layer containing said beta-naphthol and said nitrogenous material adapted to prevent passage of colloidal nitrogenous or similar material therethrough, and combining sulfur with the mass.

8. The process of treating a mass of rubber coagulum or similar substance containing a protein and water, which comprises applying to the mass an alcoholic solution of beta-naphthol, forming on the surface of the mass a semi-permeable membrane consisting of a water-insoluble compound of said protein and said beta-naphthol adapted to prevent passage of colloidal nitrogenous or similar material therethrough, and combining a vulcanizing agent with the mass.

9. A mass of rubber coagulum including an insoluble layer comprising a natural constituent of the mass adapted to prevent passage of colloidal nitrogenous or similar material therethrough, said layer being characteristically different from other portions of the mass.

10. A mass of rubber coagulum having a layer formed by the action of a hydroxy derivative of the benzene series on said coagulum, adapted to prevent passage of colloidal nitrogenous or similar material therethrough, said layer being characteristically different from other portions of the mass.

11. As a new article, a mass of rubber coagulum having an insoluble layer formed by the action of hydroxy naphthalene on said coagulum adapted to prevent passage of colloidal nitrogenous or similar material therethrough.

12. As a new article, a mass of rubber coagulum having a semi-permeable membrane formed by the action of beta-naphthol on the rubber coagulum, adapted to prevent the passage of colloidal nitrogenous or similar material therethrough.

13. A mass of rubber coagulum comprising nitrogenous material and a hydroxy naphthalene forming a protective coating over nitrogenous and similar material within the mass.

14. A mass of rubber coagulum comprising nitrogenous material and beta-napthol forming a protective coating over nitrogenous and similar material within the mass.

15. A mass of rubber coagulum comprising a compound of nitrogenous material with beta-naphthol forming a protective coating over nitrogenous and similar material within the mass.

16. A mass of rubber coagulum comprising nitrogenous material, a hydroxy naphthalene forming a protective coating over nitrogenous and similar material within the mass, and a vulcanizing agent incorporated therewith.

17. A mass of rubber coagulum comprising nitrogenous material, beta-naphthol forming a protective coating over nitrogenous and similar material within the mass, and sulfur incorporated therewith.

18. A mass of rubber coagulum having a layer therein comprising nitrogenous material and beta-naphthol, and a vulcanizing agent incorporated therewith.

19. The process of treating a mass of rubber coagulum or similar substance containing nitrogenous material, which comprises subjecting the mass to a hydroxy derivative of the benzene series, forming in the mass a semi-permeable layer adapted to prevent passage of colloidal nitrogenous or similar material therethrough, said layer being characteristically different from other portions of the mass, and combining a vulcanizing agent with the mass.

20. The process of treating a mass of rubber coagulum or similar substance containing nitrogenous material, which comprises subjecting the mass to an agent adapted to form therein a layer comprising part of the mass capable of preventing the passage of colloidal nitrogenous matter therefrom, said layer being characteristically different from other portions of the mass, and forming said layer.

21. The process of treating a mass of rubber coagulum or similar substance containing nitrogenous material, which comprises subjecting the mass to an agent adapted to form a semi-permeable layer comprising part of the mass capable of preventing the passage of colloidal nitrogenous or similar material therethrough, said layer being characteristically different from other portions of the mass, and forming said layer.

22. The process of treating a mass of rubber coagulum or similar substance containing nitrogenous material, which comprises subjecting the mass to an organic substance adapted to act upon the nitrogenous material, to form in the mass an insoluble layer comprising nitrogenous material forming part of the mass adapted to prevent the passage of colloidal nitrogenous or similar material therethrough, said layer being characteristically different from other portions of the mass, and forming said layer.

23. The process of treating a mass of rubber coagulum or similar substance containing nitrogenous material, which comprises subjecting the mass to a hydroxy derivative of the benzene series, and forming in the mass a layer comprising said nitrogenous material and said hydroxy derivative adapted to prevent passage of colloidal nitrogenous or similar material therethrough, said layers being characteristically different from other portions of the mass.

24. The process of treating a mass of rubber coagulum or similar substance containing nitrogenous material, which comprises subjecting the mass to a hydroxy derivative of a polycyclic member of the benzene series, and forming in the mass a layer adapted to prevent passage of colloidal nitrogenous or similar material therethrough.

25. The process of treating a mass of rubber coagulum or similar substance containing nitrogenous material, which comprises subjecting the mass to a hydroxy naphthalene, and forming in the mass a layer adapted to prevent passage of colloidal nitrogenous or similar material therethrough.

26. The process of treating a mass of rubber coagulum or similar substance containing nitrogenous material, which comprises applying beta-naphthol or its derivatives to the mass, and forming a semi-permeable membrane on the surface of said mass consisting of a layer containing said beta-naphthol and said nitrogenous material adapted to prevent passage of colloidal nitrogenous or similar material therethrough.

27. The process of treating a mass of rubber coagulum or similar substance containing a protein and water, which comprises applying to the mass an alcoholic solution of beta-napthol, and forming on the surface of the mass a semi-permeable membrane consisting of a water-insoluble compound of said protein and said beta-naphthol adapted to prevent passage of colloidal nitrogenous or similar material therethrough.

28. The process of treating a mass of rubber coagulum or similar substance containing nitrogenous material, which comprises subjecting the mass to a hydroxy derivative of the benzene series, and forming in the mass a semi-permeable layer adapted to prevent passage of colloidal nitrogenous or similar material therethrough, said layer being characteristically different from other portions of the mass.

29. A mass of rubber coagulum having a layer therein comprising nitrogenous material and beta-naphthol.

Signed at New York, county and State of New York, this 5 day of January, 1917.

EDWARD MARK SLOCUM.